United States Patent
Qi et al.

(10) Patent No.: US 11,208,944 B2
(45) Date of Patent: Dec. 28, 2021

(54) COOLING SYSTEM FOR INTERNAL COMBUSTION ENGINE

(71) Applicant: Qingdao Auto Radiator Co., Ltd., Qingdao (CN)

(72) Inventors: Dongliang Qi, Qingdao (CN); Qiaoguang Sui, Qingdao (CN); Chao Zheng, Qingdao (CN)

(73) Assignee: Qingdao Auto Radiator Co., Ltd., Qingdao (CN)

( * ) Notice: Subject to any disclaimer, the term of this patent is extended or adjusted under 35 U.S.C. 154(b) by 0 days.

(21) Appl. No.: 16/979,507

(22) PCT Filed: Dec. 4, 2019

(86) PCT No.: PCT/CN2019/122961
§ 371 (c)(1),
(2) Date: Sep. 9, 2020

(87) PCT Pub. No.: WO2021/027189
PCT Pub. Date: Feb. 18, 2021

(65) Prior Publication Data
US 2021/0239031 A1 Aug. 5, 2021

(30) Foreign Application Priority Data
Aug. 13, 2019 (CN) .......................... 201921301988.X (51) Int. Cl.
*B60K 11/04* (2006.01)
*F01P 3/18* (2006.01)
*F01P 5/02* (2006.01)

(52) U.S. Cl.
CPC ................ *F01P 3/18* (2013.01); *B60K 11/04* (2013.01); *F01P 5/02* (2013.01);
(Continued)

(58) Field of Classification Search
CPC ........ F01P 1/06; F01P 3/18; F01P 5/02; F01P 2003/182; F01P 2003/185;
(Continued)

(56) References Cited

U.S. PATENT DOCUMENTS 5,386,873 A * 2/1995 Harden, III ......... F04D 29/5833
165/47
6,408,939 B1 * 6/2002 Sugimoto ............. F28D 1/0435
165/135

(Continued)

*Primary Examiner* — Grant Moubry (57) ABSTRACT

The disclosure provides a novel cooling system for an internal combustion engine, which comprises a cooling fan, a first water radiator, an intercooler and a second water radiator, wherein the intercooler is positioned between the first water radiator and the second water radiator; the first water radiator is positioned at one end, close to an air inlet pipe, of an air inlet side of the intercooler, and the second water radiator is positioned at one end, close to an air outlet pipe, of an air outlet side of the intercooler; and the first water radiator, the intercooler and the second water radiator jointly form a heat exchange unit, and the cooling fan is provided on an outer side of the heat exchange unit. According to the disclosure, the heat exchange is more sufficient, the efficiency is higher, the water resistance is smaller, the cold air demand is less.

5 Claims, 5 Drawing Sheets

(52) U.S. Cl.
CPC ... *F01P 2003/185* (2013.01); *F01P 2003/187* (2013.01); *F01P 2060/02* (2013.01)

(58) Field of Classification Search
CPC . F01P 2003/187; F02B 29/04; F02B 29/0406; F02B 29/0425; F02B 29/0437; F02B 29/045; F02B 29/0456; F02B 29/0462; F02B 29/0475; F02M 31/20; B60K 11/00; B60K 11/02; B60K 11/04; B60K 11/06
See application file for complete search history.

(56) References Cited

U.S. PATENT DOCUMENTS

| | | | |
|---|---|---|---|
| 6,957,689 B2 * | 10/2005 | Ambros | F02B 29/0475 165/41 |
| 7,228,885 B2 * | 6/2007 | Kolb | B60H 1/00328 165/42 |
| 7,347,248 B2 * | 3/2008 | Kolb | B60H 1/00328 165/42 |
| 2004/0104007 A1 * | 6/2004 | Kolb | B60K 11/02 165/41 |
| 2018/0156542 A1 * | 6/2018 | Kolb | F28D 1/0417 |

* cited by examiner

COOLING SYSTEM FOR INTERNAL COMBUSTION ENGINE

TECHNICAL FIELD

The disclosure relates to the field of engine cooling of an internal combustion engine, in particular to a novel cooling system for the internal combustion engine.

BACKGROUND

At present, most engines of internal combustion engines adopt a liquid cooling mode and are provided with turbochargers, cooling liquid is cooled by using a water radiator, and pressurized air is cooled by using an air-to-air intercooler. The temperature distribution of the engine cooling system is usually the highest in an inlet part of the intercooler, the next in the water radiator and the lowest in an outlet part of the intercooler. In the working process, the heat of the cylinder body of the engine is absorbed by the cooling liquid, the cooling liquid is conveyed to an external water radiator by utilizing the power of a water pump, and the external water radiator exchanges the heat to outdoors via a cooling fan; and the temperature of intake air of the engine is increased after the intake air of the engine is pressurized by the turbocharger, then the intake air enters the air-to-air intercooler, heat is exchanged into outdoors via the cooling fan, and the cooled pressurized air enters the engine for combustion. In reality, the water radiator and the air-to-air intercooler are usually arranged together. According to the order in which cooling air passes sequentially, they are mainly divided to two structures of a series type and a parallel type.

Figure 1:
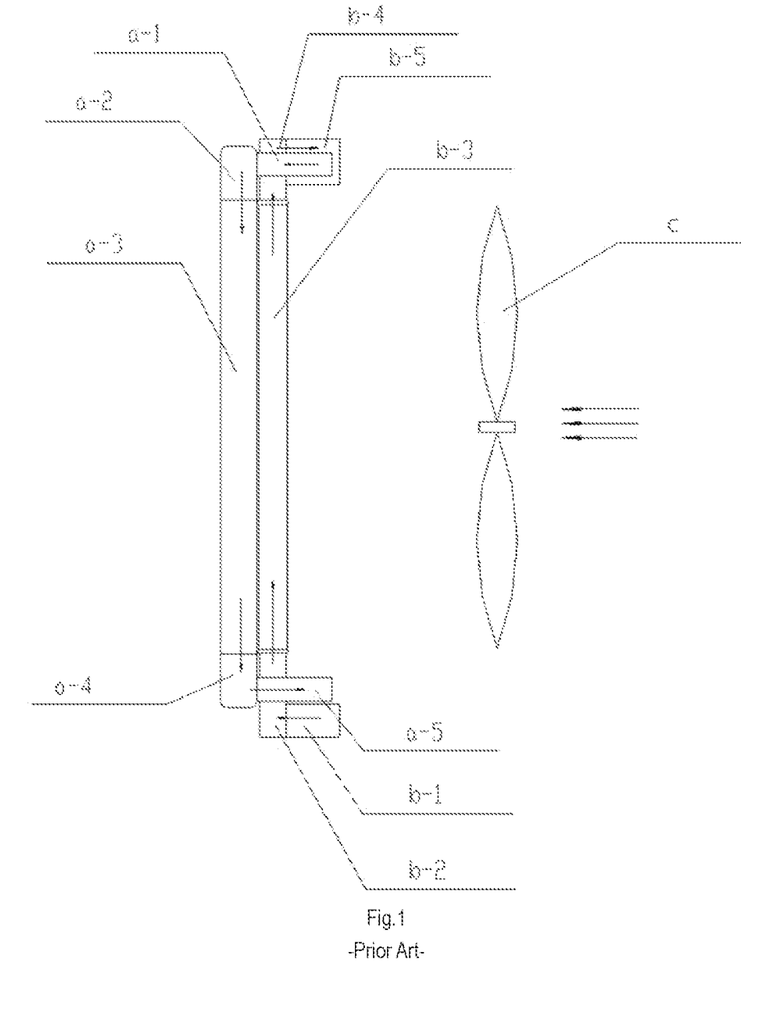
FIG. 1 is a schematic view showing a serial type structure of a water radiator cooling system in the prior art.

A schematic view showing a serial type structure of a water radiator cooling system in the prior art as shown in FIG. 1:

it includes a water radiator, an intercooler, and a cooling fan c, and the water radiator and the intercooler are provided in series;

the water radiator a is provided with a water inlet pipe a-1, a water inlet chamber a-2, a first core body a-3, a water outlet chamber a-4 and a water outlet pipe a-5;

the intercooler b is provided with an air inlet pipe b-1, an air inlet chamber b-2, a second core body b-3, an air outlet chamber b-4 and an air outlet pipe b-5;

it also includes an engine, high-temperature cooling liquid flowing out of the engine sequentially passes through the water inlet pipe a-1 and the water inlet chamber a-2, then flows into the first core body a-3 to be cooled, and sequentially passes through the water outlet chamber a-4 and the water outlet pipe a-5 to enter the engine cylinder body in the engine;

pressurized hot air sequentially passes through the air inlet pipe b-1 and the air inlet chamber b-2, then enters the second core body b-3 to be cooled, and sequentially passes through the air outlet chamber b-4 and the air outlet pipe b-5 to enter the engine cylinder body for combustion;

A cooling fan c is provided on outer sides of the water radiator a and the intercooler b, and the cooling fan c blows cooling air into the second core body b-3 and performs heat exchange with the pressurized hot air in the second core body b-3; the temperature of the pressurized hot air after heat exchange is reduced and enters the engine cylinder body for combustion, the temperature of the cooling air after heat exchange is increased and enters the first core body a-3 to complete heat exchange with high-temperature cooling liquid, the temperature of the cooling liquid after heat exchange is reduced, the temperature of the cooling air is continuously increased, the cooling air after temperature increase is blown away from the first core body a-3 by the cooling fan c to remove heat, and the cooling liquid after temperature reduction sequentially passes through the water outlet chamber a-4 and the water outlet pipe a-5 to enter the engine;

according to the structure, the pressurized hot air in the second core body b-3 at the air inlet end of the intercooler b has a high temperature and large heat, and the cooling air after passing through the air inlet end of the second core body b-3 of the intercooler b has a large temperature increase, so that the cooling effect of the water radiator a is greatly deteriorated.

Figure 2:
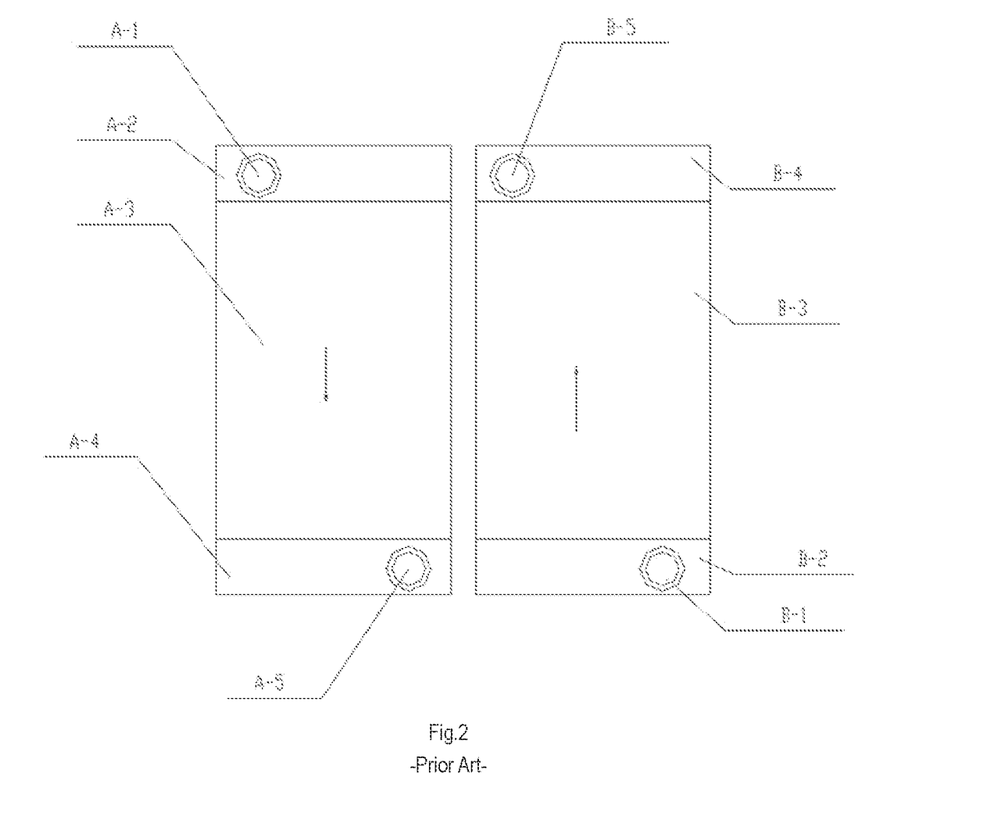
FIG. 2 is a schematic diagram of a parallel type structure of the water radiator cooling system in the prior art.

A schematic diagram of a parallel type structure of the water radiator cooling system in the prior art as shown in FIG. 2:

it includes a water radiator, an intercooler, and a cooling fan, and the water radiator and the intercooler are provided in parallel;

when the connecting mode works, high-temperature cooling liquid in the engine flows out of the engine, then sequentially passes through the water inlet pipe A-1 and the water inlet chamber A-2, flows into the first core body A-3 to be cooled, then sequentially passes through the water outlet chamber A-4 and the water outlet pipe and flows into the engine cylinder body;

pressurized hot air sequentially passes through the air inlet pipe B-1 and the air inlet chamber B-2, flows into the second core body B-3 to be cooled, and then sequentially passes through the air outlet chamber B-4 and the air outlet pipe B-5 to enter the engine for combustion;

the first core body A-3 and the second core body B-3 are arranged in parallel, a cooling fan is provided on outer sides of the first core body A-3 and the second core body B-3, and the cooling fan blows low-temperature cooling air into the first core body A-3 and the second core body B-3 simultaneously; the pressurized hot air in the second core body B-3 exchanges heat with the cooling air by the second core body B-3, the temperature of the pressurized hot air is reduced, the temperature of the cooling air is increased, the pressurized hot air after temperature reduction enters an engine cylinder body for combustion, and the cooling air after temperature increase is blown away from the second core body B-3 by the cooling fan to remove heat; meanwhile, the high-temperature cooling liquid performs heat exchange with the cooling air by the first core body A-3, the temperature of the high-temperature cooling liquid is reduced, the temperature of the cooling air is increased, the cooling air after temperature increase is blown away from the first core body A-3 by the cooling fan to remove heat, and the cooled cooling liquid sequentially passes through the water outlet chamber A-4 and the water outlet pipe A-5 and then enters the engine, so that the circulation process of the cooling liquid is completed;

according to the structure, the cooling air passing through an air outlet end of the second core body B-3 of the intercooler B has small temperature increase, the cooling air is blown away from a cooling module without sufficient heat exchange, and the cooling air is wasted.

In both of the above embodiments, the applicants have found the following deficiencies in the prior art.

In the prior art, the low-temperature cooling air is blown away from the cooling module by the cooling fan after at most two times of heat exchange, the temperature increase is small, the heat exchange is insufficient, and enough heat cannot be taken away. Especially in the prior art, the cooling air with the same temperature is used for simultaneously cooling a high-temperature part and a low-temperature part of the core body of the intercooler; the large temperature difference heat exchange advantage of the high-temperature part of the intercooler is not fully utilized, the cooling air subjected to low-temperature heat exchange is not reused or is not fully reused, and the low-temperature cooling air is wasted; and the cooling air passing through the core body of the water radiator is not reused. The prior art does not fully utilize the temperature field distribution characteristics of each heat exchanger, and the defects cause that the cooling module in the prior art is low in heat exchange efficiency and large in size and weight; and the cooling fan has high energy consumption and loud noise.

SUMMARY

The disclosure provides a novel cooling system for an internal combustion engine, which fully utilizes the distribution characteristics of temperature fields of different parts of an intercooler and water radiators, and utilizes the advantages of high heat exchange performance of high-temperature parts, so that the heat exchange is more sufficient and the heat exchange efficiency is higher; meanwhile, due to the parallel connection design of two water radiators, the resistance of the cooling water path is greatly reduced, and the core body of the water radiator can be made thinner than that in the prior art; on the premise of meeting the heat exchange performance, the size of the intercooler and the water radiator can be smaller to effectively reduce the weight and the volume of the heat exchange unit, the demand for cold air is smaller, the fan power is smaller, and the efficiency of the whole cooling system is maximized. The technical solution of the disclosure includes providing a novel cooling system for an internal combustion engine, comprising a cooling fan, a first water radiator, an intercooler and a second water radiator, wherein the intercooler is positioned between the first water radiator and the second water radiator; and the first water radiator, the intercooler and the second water radiator jointly form a heat exchange unit, and the cooling fan is provided on the outer side of the heat exchange unit; the first water radiator is provided with a first water inlet pipe, a first water inlet chamber, a first core body, a first water outlet chamber and a first water outlet pipe which are sequentially communicated; the second water radiator is provided with a second water inlet pipe, a second water inlet chamber, a second core body, a second water outlet chamber and a second water outlet pipe which are sequentially communicated; the first water outlet pipe is communicated with the second water outlet pipe by the first water outlet chamber or a round pipe; the intercooler is provided with an air inlet pipe, an air inlet chamber, a third core body, an air outlet chamber and an air outlet pipe which are sequentially communicated; the cooling fan, the first water radiator and the intercooler are sequentially connected by cooling air blown by the cooling fan so as to form a serial type structure; the cooling fan, the intercooler and the second water radiator are sequentially connected by cooling air blown when the cooling fan works so as to form a serial type structure; and simultaneously, the first water radiator and the second water radiator are in a parallel type structure.

Further, the first water radiator is positioned at one end, close to the air inlet pipe, of an air inlet side of the intercooler, and the second water radiator is positioned at one end, close to the air outlet pipe, of an air outlet side of the intercooler.

Further, the first core body of the first water radiator and the second core body of the second water radiator are parallel to a windward surface of the third core body of the intercooler.

Further, the cooling air blown by the cooling fan comprises two parts, one part is blown to an air outlet pipe side of the third core body of the intercooler and then passes through the second core body of the second water radiator, and the other part is blown to the first core body of the first water radiator and then passes through an air inlet pipe side of the third core body of the intercooler.

Further, the first core body, the second core body and the third core body are positioned on different vertical surfaces relative to the cooling fan.

The disclosure provides a novel cooling system for an internal combustion engine, which fully utilizes the distribution characteristics of temperature fields of different parts of an intercooler and water radiators, and utilizes the advantages of high heat exchange performance of high-temperature parts, so that the heat exchange is more sufficient and the heat exchange efficiency is higher; meanwhile, due to the parallel connection design of two water radiators, the resistance of the cooling water path is greatly reduced, and the core body of the water radiator can be made thinner than that in the prior art; on the premise of meeting the heat exchange performance, the size of the intercooler and the water radiator can be smaller to effectively reduce the weight and the volume of the heat exchange unit, the demand for cold air is smaller, the fan power is smaller, and the efficiency of the whole cooling system is maximized.

BRIEF DESCRIPTION OF DRAWINGS

In order to more clearly illustrate the embodiments of the present disclosure or the prior art, the accompanying drawings, which are required to be used in embodiments or descriptions of prior art, will now be described briefly. It will be apparent that the drawings in the following description are only some embodiments of the disclosure. For a person skilled in the art, other drawings can be obtained from these drawings without involving any inventive effort.

DETAILED DESCRIPTION OF THE EMBODIMENTS

The technical solutions in the embodiments of the present disclosure will be described clearly and completely in conjunction with the embodiments of the present disclosure. Obviously, the described embodiments are only a part of the embodiments of the present disclosure, but not all the embodiments. Based on the embodiments of the present disclosure, all other embodiments obtained by a person of ordinary skill in the art without involving any inventive effort are within the scope of the present disclosure.

Figure 3:
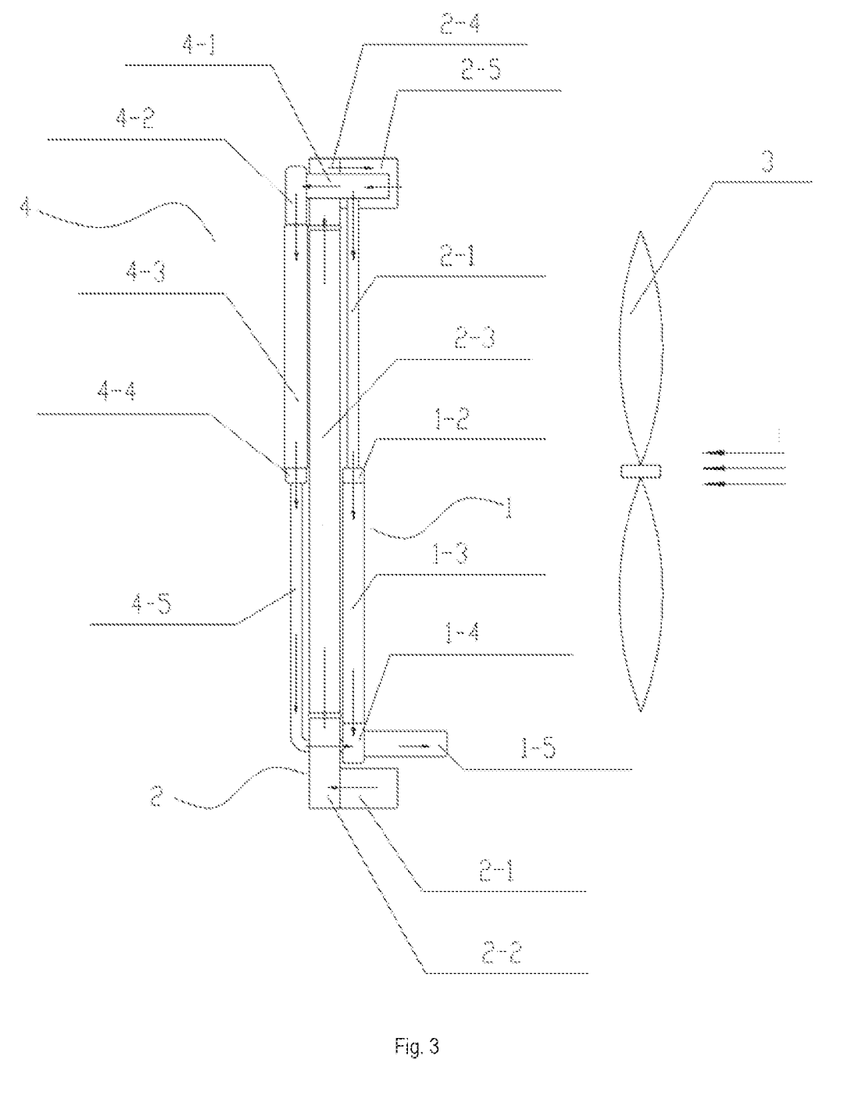
FIG. 3 is a front view of an overall structure of a novel cooling system for an internal combustion engine of the present application.
Figure 4:
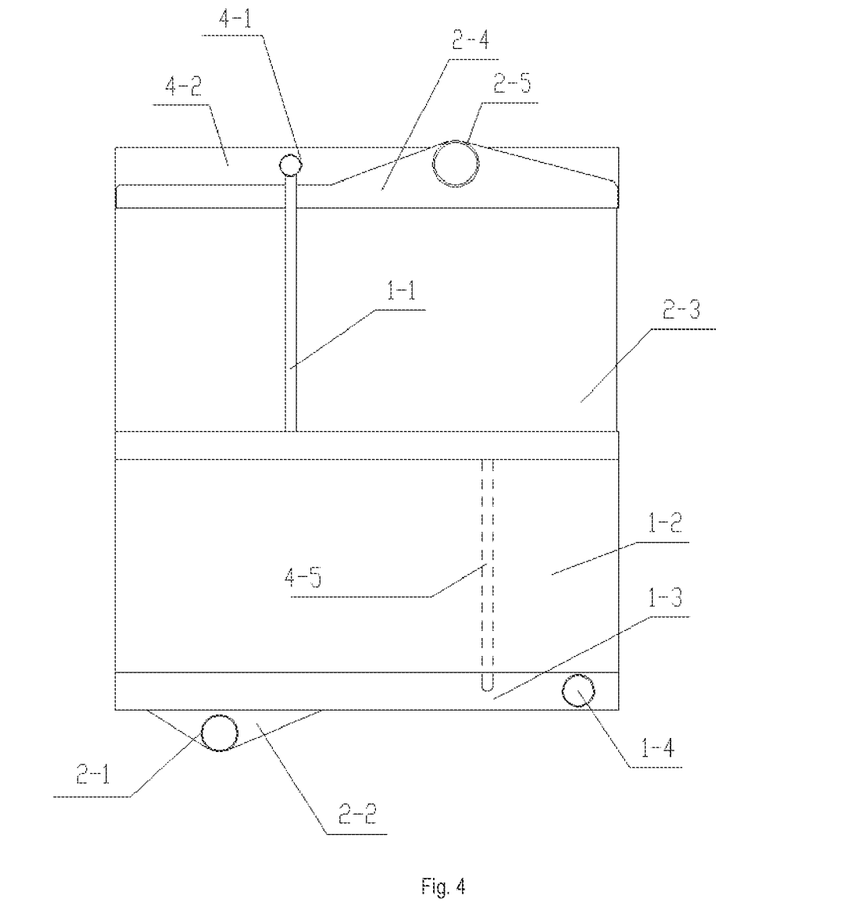
FIG. 4 is a right view of a plane structure of the novel cooling system for the internal combustion engine shown in FIG. 3.
Figure 5:
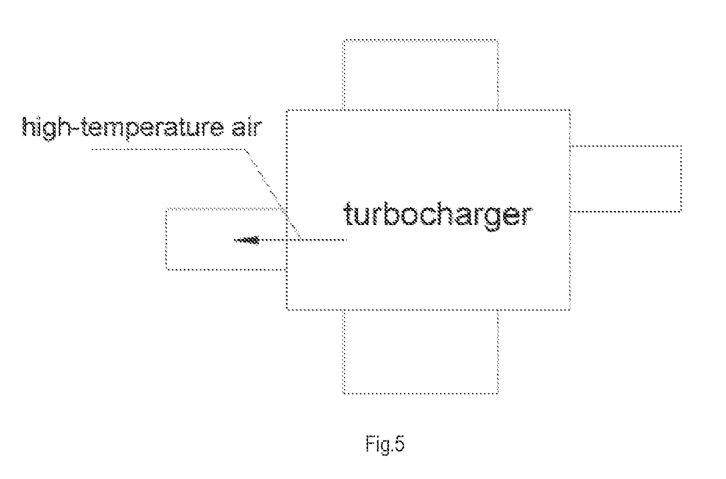
FIG. 5 is a block diagram of the turbocharger and its high-temperature air flow outlet.

In the embodiment of the disclosure, a novel cooling system for an internal combustion engine, as seen in FIGS. 3 and 4, comprises a cooling fan 3, a first water radiator 1, an intercooler 2 and a second water radiator 4, the intercooler 2 is positioned between the first water radiator 1 and the second water radiator 4, and the first water radiator 1, the intercooler 2 and the second water radiator 4 form a heat exchange unit together, the cooling fan 3 is provided on an outer side of the heat exchange unit;

the first water radiator 1 is provided with a first water inlet pipe 1-1, a first water inlet chamber 1-2, a first core body 1-3, a first water outlet chamber 1-4 and a first water outlet pipe 1-5 which are sequentially communicated;

the second water radiator 4 is provided with a second water inlet pipe 4-1, a second water inlet chamber 4-2, a second core body 4-3, a second water outlet chamber 4-4 and a second water outlet pipe 4-5 which are sequentially communicated;

the intercooler 2 is provided with an air inlet pipe 2-1, an air inlet chamber 2-2, a third core body 2-3, an air outlet chamber 2-4 and an air outlet pipe 2-5 which are sequentially communicated;

the first water outlet pipe 1-5 is communicated with the second water outlet pipe 4-5 by the first water outlet chamber 1-4 or a round pipe;

the cooling fan 3, the first water radiator 1 and the intercooler 2 are sequentially connected by cooling air blown by the cooling fan 3 so as to form a serial type structure;

the cooling fan 3, the intercooler 2 and the second water radiator 4 are sequentially connected by cooling air blown when the cooling fan 3 works so as to form a serial type structure; and the first water radiator 1 and the second water radiator 4 are in a parallel type structure.

In the embodiment of the disclosure, as shown in FIGS. 3 and 4, the cooling air blown by the cooling fan 3 is divided into two parts, one part is blown to an air outlet pipe 2-5 side of the third core body 2-3 of the intercooler 2 and then passes through the second core body 4-3 of the second water radiator 4, and the other part is blown to the first core body 1-3 of the first water radiator 1 and then passes through the air inlet pipe 2-1 side of the third core body 2-3 of the intercooler 2.

In the embodiment of the disclosure, as shown in FIGS. 3 and 4, the first water radiator 1 is positioned at one end, close to the air inlet pipe 2-1, of an air inlet side of the intercooler 2, and the second water radiator 4 is positioned at one end, close to the air outlet pipe 2-5, of an air outlet side of the intercooler 2.

In a specific embodiment of the present disclosure, as shown in FIGS. 3 and 4, the first core body 1-3, the second core body 4-3 and the third core body 2-3 have their windward surfaces parallel, and a surface adjacent to the cooling fan 3 lie on different vertical surfaces.

In a specific embodiment of the disclosure, as shown in FIGS. 3 and 4, a first inlet pipe 21 of the intercooler 2 is used for connecting a turbocharger for supplying high-pressure gas to the engine;

Cooling liquid is provided in the first water radiator 1 and the second water radiator 4 to reduce the temperature of the engine, and the heat exchange is performed to the cooling liquid to reduce temperature when the cooling liquid passes through the core body on the water radiator.

In a specific embodiment of the disclosure, as shown in FIGS. 3 and 4, the intercooler 2 is connected with the turbocharger, the turbocharger is connected with the engine, the first water radiator 1 and the second water radiator 4 are also connected with the engine, and the first water radiator 1 and the second water radiator 4 are communicated by the first water outlet chamber 1-4 and output cooling liquid after being combined.

In a specific embodiment of the disclosure, as shown in FIGS. 3 and 4, when the engine operates, high-temperature air pressurized by the turbocharger sequentially passes through an air inlet pipe 2-1 and an air inlet chamber 2-2 of the intercooler 2 to enter an air inlet side of the third core body 2-3 of the intercooler 2 to finish the primary cooling, then enters an air outlet side of the third core body 2-3 of the intercooler 2 to finish the secondary cooling, and enters an engine for combustion through an air outlet chamber 2-4 and an air outlet pipe 2-5 of the intercooler 2.

After the cooling liquid is heated in the engine cylinder body, part of the cooling liquid passes through the first water inlet pipe 1-1 and the first water inlet chamber 1-2 of the first water radiator 1 to enter the first core body 1-3, and then passes through the first water outlet chamber 1-4 and the first water outlet pipe 1-5 to enter the engine cylinder body; and the other part of the cooling liquid simultaneously passes through the second water inlet pipe 4-1 and the second water inlet chamber 4-2 of the second water radiator 4 to enter the second core body 4-3 of the second water radiator 4 to complete heat exchange, with the temperature dropping, then passes through the second water outlet chamber 4-4 and the second water outlet pipe 4-5 to enter the first water outlet chamber 1-4, and enters the engine cylinder body to complete water circulation after being combined with the cooling liquid in the first water outlet chamber 1-4.

Meanwhile, when the cooling system operates, the low-temperature cooling air blown by the cooling fan 3 is divided into two parts:

a first part is blown to the first water radiator 1, the cooling air firstly passes through the first core body 1-3 of the first water radiator 1 and high-temperature cooling liquid in the first water radiator 1 for heat exchange, the temperature of the cooling liquid is reduced, the temperature of the cooling air is increased, and a primary heat exchange of the cooling air is completed; the cooling air after the primary temperature increase is blown away from the first core body 1-3 of the first water radiator 1 by the cooling fan 3, enters an air inlet side of the third core body 2-3 of the intercooler 2 and is carried out with a secondary heat exchange on the pressurized high-temperature air; and the temperature of the cooling air subjected to the secondary heat exchange is very high, and the cooling air is blown away from the third core body 2-3 of the intercooler 2 by the cooling fan 3 to remove heat;

a second part is blown to the second water radiator 4, the cooling air firstly passes through an air outlet side of the third core body 2-3 of the intercooler 2 for heat exchange with the pressurized air subjected to the primary cooling, the temperature of the pressurized air continues to decrease, and the temperature of the cooling air is increased to complete a primary heat exchange; the cooling air subjected to the primary temperature increase is blown away from an air outlet side of the third core body 2-3 of the intercooler 2 by the cooling fan 3, and enters the second core body 4-3 of the second water radiator 4 for a secondary heat exchange with the high-temperature cooling liquid; and the temperature of these cooling air is increased after the cooling air is subjected to the two heat exchange, and the cooling air is blown away from the second core body 4-3 of the second water radiator 4 by the cooling fan 3 to remove heat;

during this cooling process, the pressurized high-temperature air entering the intercooler 2 from the turbocharger close to the third core body 2-3 of the first radiator 1 has a high temperature and still has a considerable temperature difference with the cooling air passing through the first core body 1-3 of the first water radiator 1; the cooling air after the primary temperature increase is subjected to a secondary heat exchange with pressurized high-temperature air at an air inlet side of the third core body 2-3 of the intercooler 2, the temperature is greatly increased, and then the cooling air is blown away from the third core body 2-3 of the intercooler 2 by the cooling fan 3 to carry away considerable heat; the high-temperature pressurized air after the secondary heat exchange enters an air outlet side of the third core body 2-3 of the intercooler 2 and carries little heat, and the cooled high-temperature pressurized air exchanges heat with the low-temperature cooling air blown by the cooling fan 3 for the first time at the air outlet side of the third core body 2-3 of the intercooler 2. The pressurized air is further cooled, and enters the engine for combustion after passing through the air outlet chamber 2-4 and the air outlet pipe 2-5; and the temperature of these cooling air is slightly increased after the heat exchange, the temperature difference between the cooling air and the engine high-temperature cooling liquid is still larger, these cooling air is blown away from the air outlet side of the third core body 2-3 of the intercooler 2 by the cooling fan 3 and then enters the second core body 4-3 of the second water radiator 4 where the high-temperature cooling liquid is carried out with a secondary heat exchange, the temperature of the cooling air is increased again, and the cooling air is blown away from the second water radiator 4 to remove heat.

In a specific embodiment of the disclosure, as shown in FIGS. 3 and 4, due to the fact that the distribution characteristics of the temperature fields of different parts of the intercooler 2 and the water radiator are utilized in the heat exchanger cooling system of the embodiment of the disclosure, a two-stage heat exchange structure is reasonably arranged, the temperature difference after the primary heat exchange is fully utilized, and the cooling air reasonably passes through the air outlet side of the third core body 2-3 of a low-temperature intercooler 2, a first water radiator 1 at a medium temperature, or, passes through a second water radiator 4 at the medium temperature, and the air inlet side of the third core body 2-3 of the intercooler 2 at a high temperature, which makes full use of the temperature difference between the cooling air and different parts of each intercooler to carry out a sufficient heat exchange; the temperature of the cooling air is very high when the cooling air is blown away from the heat exchange unit and enough heat is taken away so as to meet the requirements of the engine on pressurized high-temperature air cooling and cooling liquid cooling, and the heat exchange efficiency is effectively improved. Therefore, the size of the intercooler 2, the first water radiator 1, and the second water radiator 4 can be made smaller on the premise of satisfying the heat exchange performance, and the volume and the weight of the heat exchange unit are effectively reduced; meanwhile, the demand for low-temperature cooling air is less, the power of the cooling fan 3 is effectively reduced, and the whole cooling efficiency is maximized.

In a specific embodiment of the disclosure, as shown in FIGS. 3 and 4, because two water radiators (a first water radiator 1 and a second water radiator 4) are arranged in parallel, the resistance of a cooling water path is greatly reduced, and the core body of the water radiator can be made thinner than that of the water radiator in the prior art, so that the cost is reduced and the cooling efficiency is improved.

The above mentioned are only preferred embodiments of the disclosure and not intended to limit the disclosure. It is intended that the present disclosure cover the modifications, equivalents, improvements, etc. of this disclosure provided they come within the spirit and scope of this disclosure.

What is claimed is:

1. A novel cooling system for an internal combustion engine, comprising a cooling fan, a first water radiator, an intercooler and a second water radiator, wherein the intercooler is positioned between the first water radiator and the second water radiator; and the first water radiator, the intercooler and the second water radiator jointly form a heat exchange unit, and the cooling fan is provided on the outer side of the heat exchange unit;

the first water radiator is provided with a first water inlet pipe, a first water inlet chamber, a first core body, a first water outlet chamber and a first water outlet pipe which are sequentially communicated;

the second water radiator is provided with a second water inlet pipe, a second water inlet chamber, a second core body, a second water outlet chamber and a second water outlet pipe which are sequentially communicated;

the first water outlet pipe is communicated with the second water outlet pipe by the first water outlet chamber or a round pipe;

the intercooler is provided with an air inlet pipe, an air inlet chamber, a third core body, an air outlet chamber and an air outlet pipe which are sequentially communicated;

the cooling fan, the first water radiator and the intercooler are sequentially connected by cooling air blown by the cooling fan so as to form a serial type structure;

the cooling fan, the intercooler and the second water radiator are sequentially connected by cooling air blown when the cooling fan works so as to form a serial type structure; and simultaneously, the first water radiator and the second water radiator are in a parallel type structure;

the intercooler is connected with a turbocharger, the turbocharger is connected with an engine, the first water radiator and the second water radiator are also connected with the engine, and the first water radiator and the second water radiator are communicated by the first water outlet chamber and output cooling liquid after being combined;

when the engine operates, high-temperature air pressurized by the turbocharger sequentially passes through an air inlet pipe and an air inlet chamber of the intercooler to enter an air inlet side of the third core body of the intercooler to finish primary cooling, then enters an air outlet side of the third core body of the intercooler to finish a secondary cooling, and enters an engine for combustion through an air outlet chamber and an air outlet pipe of the intercooler;

after cooling liquid is heated in engine cylinder body, part of the cooling liquid passes through the first water inlet pipe and the first water inlet chamber of the first water radiator to enter the first core body, and then passes through the first water outlet chamber and the first water outlet pipe to enter the engine cylinder body; and the other part of the cooling liquid simultaneously passes through the second water inlet pipe and the second water inlet chamber of the second water radiator to enter the second core body of the second water radiator to complete heat exchange, with the temperature dropping, then passes through the second water outlet chamber and the second water outlet pipe to enter the first water outlet chamber, and enters the engine cylinder body to complete water circulation after being combined with the cooling liquid in the first water outlet chamber;

when the cooling system operates, the low-temperature cooling air blown by the cooling fan is divided into two parts.

2. The novel cooling system for the internal combustion engine according to claim 1, wherein the first water radiator is positioned at one end, close to the air inlet pipe, of an air inlet side of the intercooler, and the second water radiator is positioned at one end, close to the air outlet pipe, of an air outlet side of the intercooler.

3. The novel cooling system for the internal combustion engine according to claim 1, wherein the first core body of the first water radiator and the second core body of the second water radiator are parallel to a windward surface of the third core body of the intercooler.

4. The novel cooling system for the internal combustion engine according to claim 1, wherein the cooling air blown by the cooling fan comprises two parts, one part is blown to an air outlet pipe side of the third core body of the intercooler and then passes through the second core body of the second water radiator, and the other part is blown to the first core body of the first water radiator and then passes through an air inlet pipe side of the third core body of the intercooler.

5. The novel cooling system for the internal combustion engine according to claim 1, wherein the first core body, the second core body and the third core body are positioned on different vertical surfaces relative to the cooling fan.

* * * * *